(No Model.)
M. CAMPBELL.
WIRE BALE TIE.
No. 263,679. Patented Sept. 5, 1882.
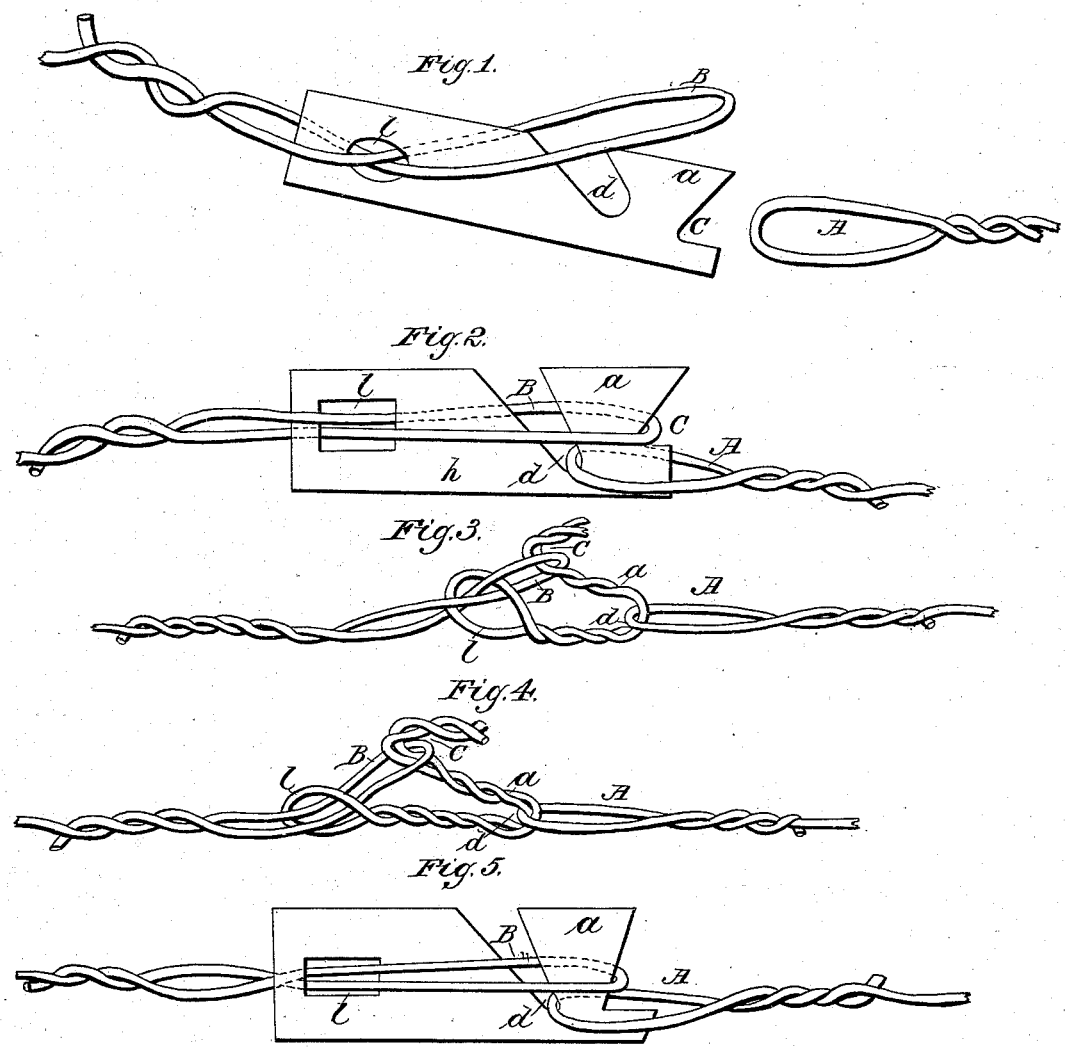
Witnesses.
John M. Brown.
Orrie N. Kimmi[?]
Inventor.
Marvin Campbell

UNITED STATES PATENT OFFICE.

MARVIN CAMPBELL, OF SOUTH BEND, INDIANA.

WIRE BALE-TIE.

SPECIFICATION forming part of Letters Patent No. 263,679, dated September 5, 1882.

Application filed June 15, 1882. (No model.)

*To all whom it may concern:*

Be it known that I, MARVIN CAMPBELL, of the city of South Bend and county of St. Joseph, and State of Indiana, have invented certain new and useful Improvements in Wire Bale-Ties; and I do hereby declare the following to be a full and exact description, whereby those skilled in the art to which my invention belongs may be enabled to make and use the same, reference being had to the accompanying drawings, forming a part of this specification.

As my invention relates only to the manner in which I form or prepare the two ends of the bale-tie, and afterward to the way in which I lock them together, I only show in the drawings short portions from each end of the bale-tie, as I deem that sufficient to clearly illustrate my improvement.

In the drawings similar letters of reference refer to like parts in all of the figures.

Figure 1 shows each of the two ends of the bale-tie as I construct them. In this figure the hook $a$ which I use is made of sheet metal. Fig. 2 shows the ends as locked together after being passed about the bale. Fig. 3 also shows the ends as locked together, but with the hook $a$ made of twisted wire instead of sheet metal. Figs. 4 and 5 show the ends locked together in such a way that when unlocked the hook $a$ will be entirely detached from the bale-tie.

To construct my bale-tie, I form one end of the wire or analogous bale-tie material into a simple loop, as shown at A in Fig. 1. To prepare the other end of the tie, when I desire the hook $a$ to be permanently attached to the bale-tie, I pass the end of the wire through the eye or loop $l$ of the hook $a$, draw it beyond the point C of said hook, then bend the wire back and return it upon the other side of said hook $a$, and pass it through the eye or loop $l$, and on a little back of the hook $a$, where I twist it to the main wire, thus forming the loop B, crossed at the point $l$, at which point the hook $a$ is suspended by the eye or loop $l$, but so loosely as to admit of its slipping backward or forward from the point $l$.

The hook $a$ may be made of sheet metal, as shown in Fig. 1, or of twisted wire, as shown in Fig. 3; but the above mode of construction will refer to either kind of hook, as the process is the same whichever kind of hook is used. The same is true of the locking, and the following explanation of the mode of locking the two ends together will refer to both Figs. 2 and 3.

It is obvious that when the wire hook is used the notch $c$ may be dispensed with and the manner of working still be the same and as effective, provided the open side of the hook is long enough, so that when drawn down by the loop B resting upon it, it will be drawn across the loop $l$, and so, though the open side be straight, it will, by thus lying across the loop, prevent the escape of the loop B, acting, as it does, in the manner of a toggle; but if the bend is not made at C to form the notch $c$, the mode of operating, which I will now describe, will be the same.

To lock the two ends together after they have been passed about the bale-tie, pass the loop A over the hook $a$ to the point $d$. Then pass the loop B over the hook $a$ and draw it to the point C. When the bale is released from the press the tension upon the bale-tie caused by the expansion of the bale will hold the loop B firmly at the point C, and while it is thus held it is impossible for the loop A to escape from the hook $a$, and the two ends can only be unlocked by reversing the operation by which they were locked, as described above.

When for convenience of construction or of shipping or for any reason it is desirable to have the hook $a$ detached from the bale-tie when it is not in use about a bale the two ends of the bale-tie will both be formed into a simple loop, and the locking, when either kind of hook is used, will be effected as shown in Figs. 4 and 5, to wit: The loop A is passed over the hook $a$ to point $d$. The loop B is passed through the loop or eye $l$ and over the hook $a$ to the point C, when it will be seen that the loop A will be securely held, so that it cannot be released from the hook $a$ except by reversing the operation by which the locking was effected.

I show the band made of wire. It may be of sheet metal, hoop-iron, or any suitable material.

What I claim as new, and desire to secure by Letters Patent, is—

1. A bale-tie, one end having the simple loop A, the other end having the loop B, crossed at the point $l$, and from this point the hook $a$ suspended, substantially as herein described and shown, and for the purpose set forth.

2. The hook $a$, having the two notches $d$ and $c$ and the loop or eye $l$, for the purpose of engaging or locking the two ends of a bale-tie.

3. The combination, in a bale-tie, of the loops A and B and the hook $a$, substantially as and for the purpose herein described, and shown in Figs. 2 and 3.

4. The combination, in a bale-tie, of the loops A and B and the hook $a$, substantially as and for the purpose herein described, and shown in Figs. 4 and 5.

5. In a bale-tie fastening, the sliding hook, in combination with a loop or loops upon one end for the purpose of engaging the other end of the bale-tie.

In testimony whereof I have hereunto set my hand in the presence of two witnesses.

MARVIN CAMPBELL.

Witnesses:
ORRIN KIMMIS,
J. M. BROWN.